US010235633B2

(12) United States Patent
Tereshkov et al.

(10) Patent No.: US 10,235,633 B2
(45) Date of Patent: Mar. 19, 2019

(54) METHOD AND SYSTEM FOR LINKING HETEROGENEOUS DATA SOURCES

(71) Applicant: Medidata Solutions, Inc., New York, NY (US)

(72) Inventors: Vladimir Tereshkov, Leesburg, VA (US); Syed Haider, Syosset, NY (US); Valerio Aimale, Santa Fe, NM (US); Joshua Hartman, Fort Washington, PA (US); Christopher Bound, Perkasie, PA (US); Ron Katriel, Oakland, NJ (US)

(73) Assignee: Medidata Solutions, Inc., New York, NY (US)

( * ) Notice: Subject to any disclaimer, the term of this patent is extended or adjusted under 35 U.S.C. 154(b) by 995 days.

(21) Appl. No.: 14/577,220

(22) Filed: Dec. 19, 2014

(65) Prior Publication Data

US 2016/0180245 A1 Jun. 23, 2016

(51) Int. Cl.
*G06N 20/20* (2019.01)
*G06N 20/00* (2019.01)
(Continued)

(52) U.S. Cl.
CPC .......... *G06N 20/00* (2019.01); *G06F 16/215* (2019.01); *G06F 16/2237* (2019.01);
(Continued)

(58) Field of Classification Search
CPC ........ G06N 20/00; G06N 20/10; G06N 20/20; G06F 16/2237; G06F 16/285;
(Continued)

(56) References Cited

U.S. PATENT DOCUMENTS 6,839,714 B2 * 1/2005 Wheeler ........... G06F 17/30557
9,037,615 B2 * 5/2015 Bornea ............. G06F 17/30292
707/803

(Continued)

OTHER PUBLICATIONS

Mitsopoulou, Evangelia et al.; Connecting medical educational resources to the Linked Data cloud: the mEducator RDF Schema, store and API; Linked Learning 2011: 1st International Workshop on eLearning Approaches for the Linked Data Age, 8th Extended Semantic Web conference (ESWC2011); 15 pages. (Year: 2011).*

(Continued)

*Primary Examiner* — Stanley K. Hill
(74) *Attorney, Agent, or Firm* — Steptoe & Johnson LLP; Robert Greenfeld

(57) ABSTRACT

A method for linking records (related to an entity) from separate databases may include extracting a first record from a first database as a first vector, extracting a second record from a second database as a second vector, generating first and second sub-vectors for the first and second vectors, where each sub-vector includes quality features from the respective vector, pre-processing the first and second sub-vectors using domain knowledge, calculating a distance assessment classifier based on the first and second sub-vectors, and determining whether the distance represented by the distance assessment classifier is greater than a threshold. If the distance is greater than the threshold, the records may be linked; if not, the method extracts additional records and repeats after generating first and second sub-vectors until the distance is greater than the threshold. A system for linking records is also disclosed.

7 Claims, 4 Drawing Sheets

(51) Int. Cl.
*G06F 16/25* (2019.01)
*G06F 16/28* (2019.01)
*G06F 16/22* (2019.01)
*G06F 16/33* (2019.01)
*G06F 16/215* (2019.01)

(52) U.S. Cl.
CPC ............ *G06F 16/25* (2019.01); *G06F 16/254* (2019.01); *G06F 16/285* (2019.01); *G06F 16/3346* (2019.01)

(58) Field of Classification Search
CPC .... G06F 16/288; G06F 16/215; G06F 16/254; G06F 16/3346
See application file for complete search history.

(56) References Cited

U.S. PATENT DOCUMENTS

| | | | |
|---|---|---|---|
| 9,535,902 B1* | 1/2017 | Michalak | ............... G06F 17/271 |
| 2007/0174277 A1 | 7/2007 | Giang et al. | |
| 2009/0210418 A1 | 8/2009 | Arasu et al. | |
| 2011/0106821 A1 | 5/2011 | Hassanzadeh et al. | |
| 2013/0006968 A1* | 1/2013 | Gusmini | ........... G06F 17/30557 707/722 |
| 2013/0238623 A1 | 9/2013 | Wyllie et al. | |
| 2014/0330845 A1 | 11/2014 | Feldschuh | |

OTHER PUBLICATIONS

Holman, C D'Arcy et al.; A decade of data linkage in Western Australia: strategic design, applications and benefits of the WA data linkage system; Aust Health Rev 2008: 32(4); pp. 766-777. (Year: 2008).*

Heath, Tom et al.; Linked Data—Evolving the Web into a Global Data Space; Morgan&Claypool Publishers; 132 pages. (Year: 2011).*

Sauleau, Erik A. et al.; Medical record linkage in health information systems by approximate string matching and clustering; BMC Medical Informatics and Decision Making 2005 5:32; pp. 1-13. (Year: 2005).*

The International Search Report and Written Opinion of the International Searching Authority, PCT/US2014/072357, dated Jun. 30, 2015.

* cited by examiner

METHOD AND SYSTEM FOR LINKING HETEROGENEOUS DATA SOURCES

BACKGROUND

While mining data, it is desirable to link databases and extract information from them. But often the data are disparate, even data that are related to a single well-defined domain or subject area. The majority of real-life data coming from different data sources is not suitable for deterministic record linkage because no unique identifiers of high quality, such as social security numbers, are available.

Other factors also contribute to the difficulties in data linking, including different standards, different schemas, different formats, various errors, inconsistencies, and out-of-date data.

Figure 1A:
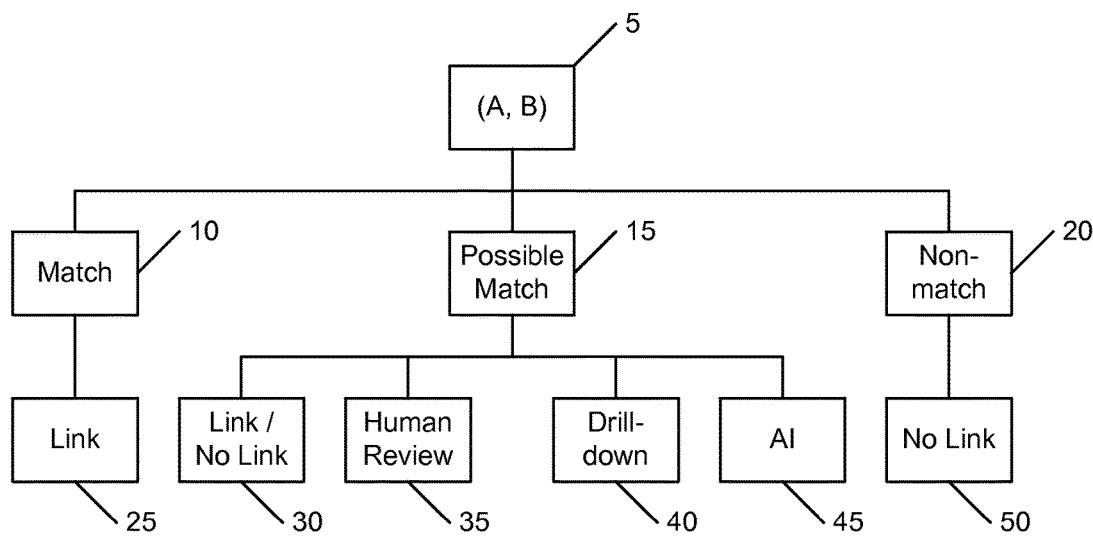
FIG. 1A is a schematic diagram of an embodiment of the present invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

This application involves resolving entities across disparate or heterogeneous data sources. An "entity" may be a person (e.g., Joe Smith), an organization (e.g., Google), a therapeutic area (e.g., Diabetes Type 1), a clinical trial title (e.g., Effects of Sitagliptin (Januvia®) on Blood Glucose Control in Patients With Type 1 Diabetes), a concept (e.g., Phase III), an object (e.g., Methodist Hospital), or other item that may be related to a record in a database. Put somewhat differently, a record in a database may be an instance of an entity in that database. A semantic entity may be "assembled" or resolved from disparate data sources using probabilistic record matching methods. But existing probabilistic record matching methods suffer from noise, performance, and scalability issues and require manual intervention to determine appropriate algorithms/parameters and threshold values to achieve acceptable results.

The inventors have developed methods and systems that resolve entities across heterogeneous data sources using advanced algorithms, including machine-learning, data-mining, probabilistic, and artificial intelligence algorithms, in conjunction with private and publicly available dictionaries to achieve high quality data linking for particular datasets. The techniques disclosed may be performed in real-time and near-real-time applications.

The invention offers two main solutions. The first is the ability to link information from multiple databases that have no directly matching fields—databases that may have been created by different software, may have different formats of data, and have low data quality. The second is the ability to perform de-duplication and help to clean up the data in databases that may contain several instances of data related to a single entity in different formats or with errors/noise.

There are several immediate business and scientific benefits of the invention. These include offering a single source of truth across varying data sources by removing redundancy and linking similar concepts, improving collection and analysis of key performance indicators (KPI) for clinical trial operations as entities, and improving collection and analysis of safety and efficacy information for FDA approval, yet another form of entity, and providing structured information from heterogeneous data sources for making business decisions. Overall, the invention provides a broad, coherent view of clinical trials (also called "clinical studies") across industry using proprietary and public data sources for mining information of business and scientific interests. The invention offers interoperability with electronic medical records (EMR), payer (e.g., insurance, third-party payer) databases, and government agencies (e.g., Food and Drug Administration, Medicaid, Medicare), and aids in integration with emerging scientific areas and technologies, such as personalized medicine and quantified-self. Although described in some embodiments in terms of clinical settings involving clinical trials and medical data, the invention benefits industries other than those in the clinical domain that include entities and data from disparate, heterogeneous sources.

Reference is now made to FIG. 1A, which is a schematic diagram of an embodiment of the present invention. FIG. 1A shows a pair of database records (or table rows in this case) in block 5. There are three possibilities for matching A and B. First, they may be matched "deterministically" in block 10, in which case a link 25 may be generated between A and B. Second, there may be no match, as shown in block 20, in which case "no link" 50 will be generated. Third, there may be a possible or probabilistic match in block 15, which itself will generate several possibilities. A link may be made or not made (block 30), the data points can be reviewed by a human (block 35), the points may be matched using "drilldown" (block 40), which is looking for other fields within a record to see whether an exact match can be achieved, or the points may be matched using artificial intelligence (AI) (block 45). These different alternatives will be described below.

Deterministic or "rules-based" record linkage, the simplest kind of record linkage, may link together database records or tables and may generate links based on the number of individual identifiers that match among the available data sets. Two records are said to match via a deterministic record linkage procedure if all or some identifiers (above a certain threshold) are identical. Deterministic record linkage is a good option when the entities in the data sets are identified by a common identifier, such as a social security number, or when there are several representative identifiers (e.g., name, date of birth, and gender when identifying a person) whose quality of data is relatively high.

Probabilistic record linkage, sometimes called "fuzzy matching" (also called "probabilistic merging" or "fuzzy merging" in the context of merging of databases), takes a different approach to the record linkage problem by taking into account a wider range of potential identifiers, computing weights for each identifier based on its estimated ability to correctly identify a match or a non-match, and using these weights to calculate the probability that two given records refer to the same entity. Record pairs with probabilities above a certain threshold are considered to be matches, while pairs with probabilities below another threshold are considered to be non-matches; pairs that fall between these two thresholds are considered to be "possible matches" and can be further handled, for example, human reviewed, linked, or not linked, depending on the requirements. Whereas deterministic record linkage requires a series of potentially complex rules to be programmed ahead of time, which is quite often not possible because there are no unique identifiers available for "exact matching," probabilistic record linkage methods can be "trained" to perform well with little human intervention. In such a scenario, a human may provide an initial approximation based on domain (e.g., life sciences) expertise, and the system will automatically adjust all parameters for maximum quality and performance of matches.

Figure 1B:
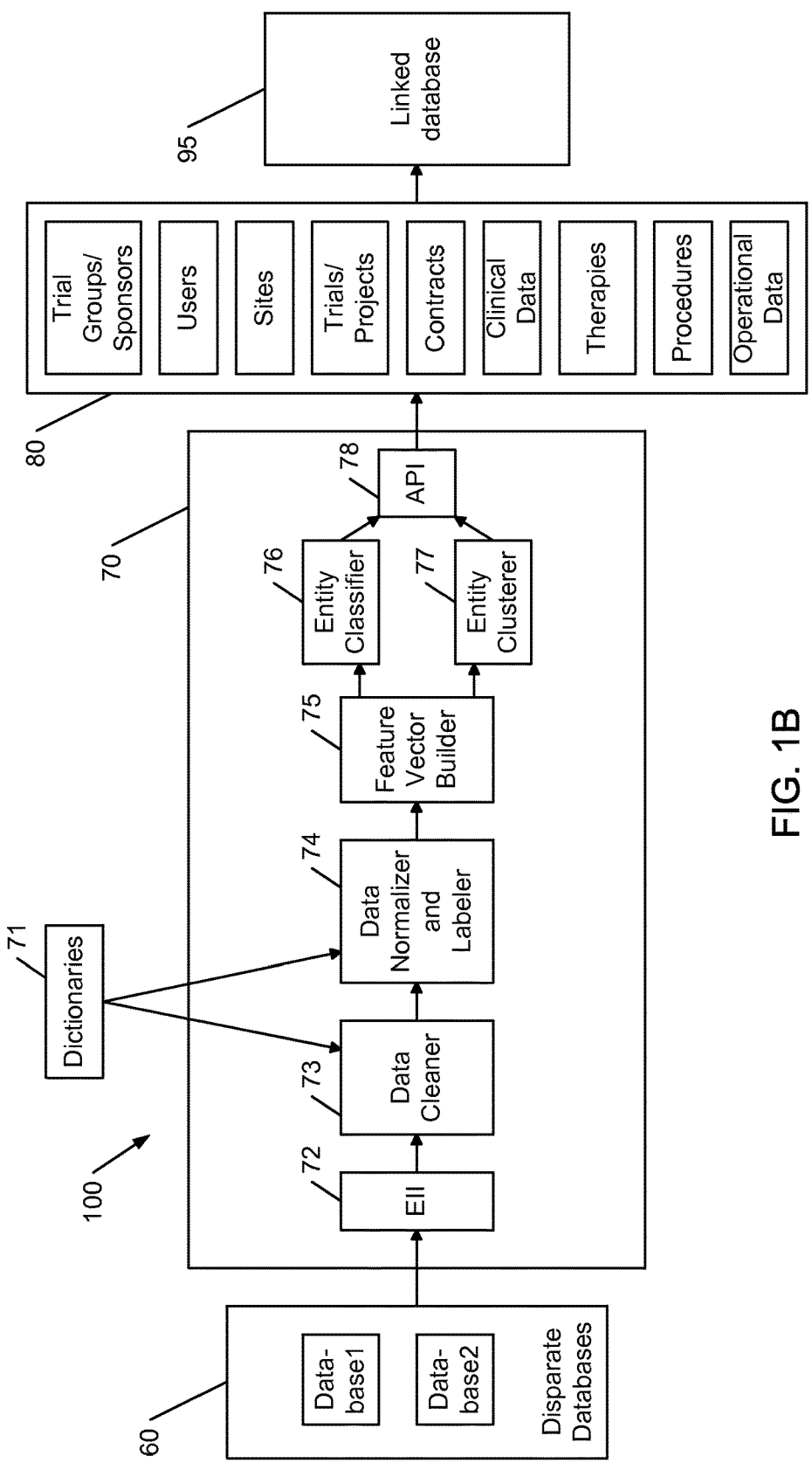
FIG. 1B is a block diagram of a system used to resolve entities and link databases probabilistically, according to an embodiment of the present invention.

Reference is now made to FIG. 1B, which is a block diagram of a system 100 used to resolve entities and link databases probabilistically, according to an embodiment of the present invention. Data may come from heterogeneous or disparate data sources or databases 60, such as database 1 and database 2. These databases may be local or may be hosted in a cloud environment, such as Amazon S3 (simple storage service). The databases may contain elements of records of interest, which may not comprise complete records. For example, database 1 may include a table of users with names and email addresses and database 2 may contain transaction history for a user. As an example in the clinical trial space, to measure safety outcomes the clinical trial may be mapped across a planning database, an operational database, and reference public databases, such as ClinicalTrials.gov database, for example. In another example, to build a holistic clinical view for a given molecule, all the trials may be linked across all databases from planning to operations. In yet another scenario, to identify underlying contributing factors in success or failure of clinical trials, end-to-end mappings across databases on subject, trial, therapeutic area, and therapy levels may be used. There are generally no fields in these tables that can function as unique identifiers that can map deterministically.

The data may be input to processing system 70, an example of which is a virtual Amazon EC2 (elastic compute cloud) machine. Processing system 70 may include EII subsystem 72, data cleaner 73, data normalizer and labeler 74, feature vector builder 75, entity classifier 76, entity clusterer 77, and API 78. EII subsystem 72 may perform enterprise information integration and/or data virtualization, which is useful if the data come from multiple databases such as Oracle, MS SQL Server, MySQL, and graph databases. EII subsystem 72 may deterministically integrate several database schemas into one federated schema, and be accessed and queried uniformly through one endpoint as a single database system. EII subsystem 72 may also provide a JDBC (Java Database Connectivity) programming interface to one or more databases and may support automatic optimization of SQL queries. An example of EII subsystem 72 is Teiid, which is a data virtualization platform environment provided by Red Hat® JBoss®.

Data cleaner 73 may parse and clean up the data by removing nonessential, non-alphanumeric characters, making the data case-insensitive, removing noise words that are contextually irrelevant (such as prepositions), fixing spelling errors, and changing plural to singular. Such parsing and cleansing may be achieved by using a dictionary 71 and/or a (natural language processing) vocabulary repository. Data cleaner 73 prepares the data for the data normalizer and labeler 74.

Data normalizer and labeler 74 may normalize and label the cleansed data by standardizing the lexical variations and ontological concepts, such as by using a root word, e.g., changing "oncological" to "oncology" and "Diabetes Type-2" to "Diabetes Mellitus." The subsystem may use a lexical and ontological dictionary 71 such as Unified Medical Language System® (UMLS®) to normalize data. (UMLS® is a U.S. National Institutes of Health (NIH) set of files and software that merges many health and biomedical vocabularies and standards to enable interoperability between computer systems.) UMLS® may use the ontology dictionary to label words or tokens to add contextual information. For example, diabetes may be labeled as "disease" or "problem," Acetominophen as "therapy," ultrasound as "diagnosis," liver as "anatomy" or "organ," etc.

Once the data are normalized and labeled, feature vector builder 75 may build vectors that include various types of features that map data in a finite dimensional space for comparison and separation. These features may include, but are not limited to, distance-based metrics (e.g., string distances), word or string counts, relative frequencies of words or strings, collocation (co-occurring words), ranking, likelihood functions, entropy, and categorical data.

After feature vectors are built, the data may go to entity classifier 76 and/or entity clusterer 77. Entity classifier 76 may use supervised machine-learning techniques to separate and classify entities in the feature space developed in feature vector builder 75. Entity classifiers may be trained on data to reduce data Type-I errors (missing data for classification) and Type-II errors (incorrect class assignment). The performance may be measured using statistical metrics such as sensitivity, specificity, PPV (positive predictive value), NPV (negative predictive value), etc. (Sensitivity is the "true-positive" rate, which is the likelihood that two entities in two databases are the same entity and are determined to be the same; specificity is the "true-negative" rate, which is the likelihood that two entities in two databases are not the same entity and are determined to be different; PPV is the proportion of entities with a positive result that are actually matched (true-positive proportion); NPV is the proportion of entities with a negative result that are actually not matched (true-negative proportion).)

Entity clusterer 77 takes a complementary approach to that used by entity classifier 76 in that it uses unsupervised machine-learning techniques to group data based on similarity in the feature space developed in feature vector builder 75, an approach commonly known as "clustering." Clustering discovers knowledge hidden from human domain experts. Such techniques have advantage over supervised techniques in terms of un-biasedness and increased coverage. Some techniques used include K-means clustering, hierarchical clustering, etc.

API 78 is an application programming interface that presents an interface to interact with the data that were produced by entity classifier 76. In this case, API 78 supports programmable interface (Java) and may be a REST-ful (representational state transfer) API.

The data from processing system 70 may be extracted and/or resolved across collections of categories or entities 80, such as trial groups/sponsors, users, sites, trials/projects, contracts, clinical data (including vitals and adverse events), therapies (including medications), procedures, and operational data. Resolved entities may be used through API 78, written to a file, or placed in database 95 containing linked data. Database 95 gathers and stores the resolved data in a harmonized schema so that the data may be accessed later. Processing may take place using shell scripts.

Below is a mathematical record linkage model by which records may be probabilistically linked. These equations describe in mathematical terms how probability or distance between two rows (vectors) may be calculated, which is one of the features determined in feature vector builder 75. In an application with two database tables, A and B, the rows (records) may be denoted by $\alpha(a)$ in table A and $\beta(b)$ in table B. The set of (linked) records M that represent identical entities may be defined by:

$$M=\{(a,b); a=b; a \in A; b \in B\} \quad \text{(Eq. 1)}$$

K characteristics may be assigned to each record. A vector, $\gamma$ (gamma), may be defined that contains the coded agreements and disagreements on each characteristic (i.e., that represent the distance between components of rows from the two tables):

$$\gamma[\alpha(a),\beta(b)]=\{\gamma^1[\alpha(a),\beta(b)], \ldots, \gamma^K[\alpha(a),\beta(b)]\} \quad \text{(Eq. 2)}$$

The conditional probability $m(\gamma)$ of observing a specific vector $\gamma$ (gamma) given (a, b) included in M may be defined as:

$$m(\gamma) = P\{\gamma[\alpha(a), \beta(b)] \mid (a, b) \in M\} = \sum_{(a,b) \in M} P\{\gamma[\alpha(a), \beta(b)]\} \cdot P[(a, b) \mid M] \quad \text{(Eq. 3)}$$

In other words, $m(\gamma)$ is a quality score of the match—the probability that a row from the first database can be matched to a row in the second database. An efficient method of determining the probability of inclusion of a sub-vector in linked set M as described in this application is based on calculating an aggregated normalized value of distances (distance assessment classifier) and comparing it with a pre-selected scalar threshold.

The blocks shown in FIG. 1B are examples of modules that may comprise system 100 and do not limit the blocks or modules that may be part of or connected to or associated with these modules. For example, entities may be matched in more than two databases, data cleaning, normalizing, and labeling functions may overlap, and not all data may be input to both entity classifier 76 and entity clusterer 77. Processing system 70 may be a standalone computer system, a system operating on a distributed network and the connections between the modules may be via wires or wireless transmission. The blocks in FIG. 1B may be implemented in software or hardware or a combination of the two, and may include processors, memory, and software instructions executed by the processors.

Figure 2:
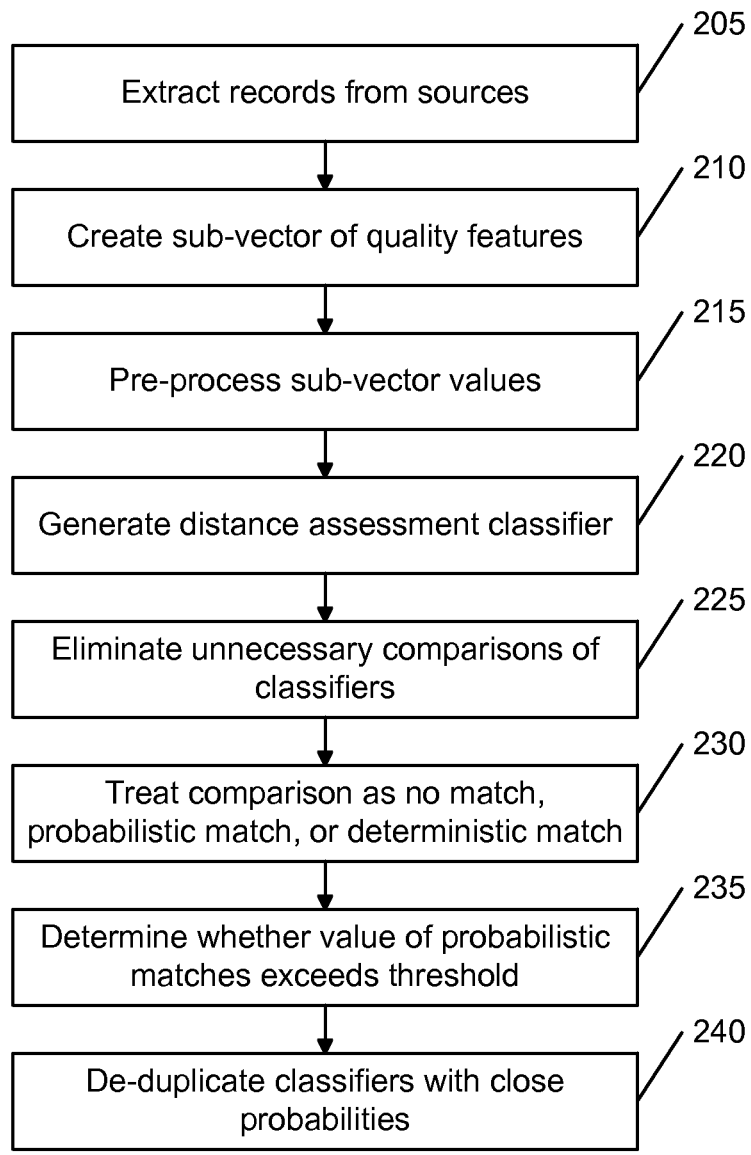
FIG. 2 is a flowchart that may be used by an entity classifier to probabilistically match records, according to an embodiment of the present invention.

FIG. 2 is a flowchart showing operations that may be used by entity classifier 76 to probabilistically match records, according to an embodiment of the present invention. In operation 205, records may be extracted from sources A and B in the form of vectors, which may be rows from regular databases. Each vector may have a set of qualifiers of various types that can be used to classify or determine the identity of each record. Each qualifier may be interpreted to be of a certain "quality" or probability with which it is unique and identifies the object described by the vector.

For example, a table in the database may have the following structure:

| Name | Address | Email | SSN |
|---|---|---|---|
| Thomas Anderson | 123 Unimatrix Zero | tanderson@matrix.com | 123-45-6789 |
| Tom Andersen | 123 Unimatrix | tanderson@matrix.com | 123-45-6789 |
| Agent Smith | 000 Unimatrix | asmith@matrix.com | 123-12-1234 |
| Smith | 0 Unimatrix | Agent.smith@matrix.com | 123-12-1234 |

Records may be extracted from the table in the form of vectors, in particular:

$$A=(\text{Name},\text{Address},\text{Email},\text{SSN}) \quad \text{(Eq. 4A)}$$

These properties, corresponding to column names, may be called "features." For example, the first extracted vector would be a 4-feature (e.g., 4-component) object:

$$A(1)=(\text{"Thomas Anderson","123Unimatrix Zero",} \\ \text{"tanderson@matrix.com","123-45-6789"}) \quad \text{(Eq. 5A)}$$

"Thomas Anderson" may be referred to as an "entity," and vector (or record) A(1) may be an instance of such entity. Alternatively, entity Thomas Anderson may be described by the database row from which vector A(1) is derived.

As another example, a table in a clinical trial database may have the following structure:

| Trial Title | Compound | Phase | Therapeutic Area |
|---|---|---|---|
| Parallel phase I trial of ixabepilone plus lapatinib and ixabepilone plus lapatinib plus capecitabine in subjects with HER2 positive locally advanced or metastatic breast cancer. | ixabepilone | I | Breast Cancer |
| Phase I Trial of Ixabepilone + Lapatinib +/− Capecitabine to Treat HER2 Positive Locally Advanced or Metastatic Breast Cancer | Ixabepilone | I | Breast Cancer |
| Randomized phase II of ixabepilone alone and ixabepilone plus cetuximab as first-line treatment for female subjects with triple negative (ER, PR, Her2 negative) locally advanced non-resectable and/or metastatic breast cancer | Ixabepilone | II | Breast Cancer |
| A phase II, open label trial of ixabepilone plus cetuximab as first line therapy for metastatic pancreatic cancer. | Ixabepilone | II | Pancreatic Cancer |

The vectors for this table may have the form:

$$A=(\text{TrialTitle},\text{Compound},\text{Phase},\text{TherapeuticArea}) \quad \text{(Eq. 4B)}$$

with the features being the column names. The first extracted vector in this table would be the following 4-feature object:

$$A(1)=(\text{"Parallel phase } I \text{ trial of ixabepilone plus} \\ \text{lapatinib and ixabepilone plus lapatinib plus} \\ \text{capecitabine in subjects with HER2 positive} \\ \text{locally advanced or metastatic breast cancer.",} \\ \text{"ixabepilone","I","Breast Cancer"}) \quad \text{(Eq. 5B)}$$

In this example, a clinical trial may be referred to as an "entity," and vector (or record) A(1) may be an instance of such entity. Alternatively, the entity trial may be described by the database row from which this vector A(1) is derived.

Referring again to the flowchart in FIG. 2, in operation 210, a sub-vector of the quality features may be created that can be used for proximity determination, in which a number from 0 to 1 is assigned that determines how "equal" these particular fields are using a special method for a distance/likelihood determination. This can be shown as follows. Some of the entity features may not identify a particular entity well. Some features are prone to human data entry error and others may appear in a number of different formats, thus these features are of lower "quality" than other features. Feature quality is a metric describing how precisely the feature may identify a particular entity. In the above first example, the SSN field precisely identifies duplicate records related to the same person, so these records can be merged together in a process called "de-duplication." The sub-vector with just the two highest quality values, Email and SSN, may be created as follows:

$$B = \text{Subset}(A) = (\text{Email}, \text{SSN}) \quad \text{(Eq. 6A)}$$

In the above clinical trial example, the TrialTitle field precisely identifies duplicate records related to the same trial, so these records can be de-duplicated, and the sub-vector with the two highest quality values, Compound and TherapeuticArea, may be created as follows:

$$B = \text{Subset}(A) = (\text{Compound}, \text{TherapeuticArea}) \quad \text{(Eq. 6B)}$$

In operation 215, to lower the noise and enhance matching, extracted values (qualifiers) of sub-vectors may be pre-processed or cleaned by a "domain-aware" data cleaner. A domain-aware data cleaner takes input and, by applying knowledge of the relevant domain or subject of interest, produces "clean" output. For example, if there is knowledge (e.g., domain expertise) that a certain field is a disease or compound, it may be helpful if it is normalized. Some examples of cleaners are:

- making all letters uppercase (or lowercase);
- removing trailing spaces;
- converting literals to numbers;
- converting numbers to literals; and
- normalizing, in the first example, the SSN from 123-45-6789 to "123456789" by removing the dashes and, in the second example, the TherapeuticArea from "Metastatic Breast Cancer" to "Breast Cancer" by removing "Metastatic."

In operation 220, a distance assessment classifier between sub-vectors may be generated as a sum of atomic classifiers. Atomic classifiers may operate on atomic probabilistic distance metrics and they are multiplied by a weight dependent on the "quality" of a particular classifier. This may be done as follows.

One sub-vector from each database extracted (or two sub-vectors from the same database used to perform de-duplication and cleaning of the database) may be taken to perform de-duplication as in the examples above:

$$V1 = \{\text{Email1}, \text{SSN1}\} \text{ and } V2 = \{\text{Email2}, \text{SSN2}\} \quad \text{(Eq. 7A)}$$

$$V1 = \{\text{Compound1}, \text{TherapeuticArea1}\} \text{ and } V2 = \{\text{Compound2}, \text{TherapeuticArea2}\} \quad \text{(Eq. 7B)}$$

The atomic distance A between vector components, determined from atomic distance metrics, may be a function returning a value between 0 and 1, which shows how close the components of the vector are. Here are two functions written in pseudo-code, for the two examples above:

$$A1 = \text{AtomicEmailComparator}( ) \{\text{return Distance}(\text{Email1}, \text{Email2});\} \quad \text{(Eq. 8A)}$$

$$A2 = \text{AtomicSSNComparator}( ) \{\text{return Distance}(\text{SSN1}, \text{SSN2});\} \quad \text{(Eq. 9A)}$$

$$A1 = \text{AtomicCompoundComparator}( ) \{\text{return Distance}(\text{Compound1}, \text{Compound2});\} \quad \text{(Eq. 8B)}$$

$$A2 = \text{AtomicTherapeuticAreaComparator}( ) \{\text{return Distance}(\text{TherapeuticArea1}, \text{TherapeuticArea2});\} \quad \text{(Eq. 9B)}$$

The total distance between vectors can then be presented as:

$$\text{Distance}(V1, V2) = A1 * \text{Weight}(\text{Email}) + A2 * \text{Weight}(\text{SSN}) \quad \text{(Eq. 10A)}$$

$$\text{Distance}(V1, V2) = A1 * \text{Weight}(\text{Compound}) + A2 * \text{Weight}(\text{TherapeuticArea}) \quad \text{(Eq. 10B)}$$

where Weight(Email), Weight(SSN), Weight(Compound), and Weight(TherapeuticArea) are coefficients related to a quality of particular vector components and may be specified manually from domain knowledge or determined or adjusted automatically by using artificial intelligence and/or evolutionary methods. For example, "SSN" and "credit card number" are high-quality fields because they have well-defined formats (and credit card numbers have built-in error correction) and may be assigned a weight close to 0.90-0.99. For the same reasons, "Compound" and "TherapeuticArea" are also high-quality fields and may be assigned a similar weight. A person's first or last names may have errors and misspellings which makes them lower quality with weights lower than 0.90 in most cases. Weights may be selected either manually from the knowledge of how clean the data are and may be selected automatically, as discussed below.

In operation 225, the system may process each record to eliminate unnecessary comparisons of classifiers. This may be done in multi-threaded/noded (e.g., Hadoop) fashion. One way to parallelize calculations and make it feasible to engage Hadoop (or some other map-reduce implementation) is to split the work in chunks. Several known methods may be used to synchronize multi-threaded matching architectures including inverted (or inverse) indexes and blocking. For example, "blocking," which is often used in search engines, may be used to mark or block a set of records dedicated for processing by a particular thread of execution or worker. After processing, the block of records may be marked as "processed," but still may be kept in memory to avoid costly changes in memory allocation (especially in a Java implementation). An "inverted index" is a data structure that stores the mapping from a resulting record to the records in both databases from which it was assembled. The purpose of an inverted index in the context of record matching is to provide a quick answer as to whether a particular record may already be processed and may have resulted in sufficient match quality, so it can be disregarded for further comparisons.

In operation 230, each comparison may be treated in one of three different ways—no match, probabilistic match, and deterministic match. For probabilistic matches, the probability value may be recorded and stored either as one of the new fields or as an inverted index. The result of matching two vectors can be:

- the vectors are identical, which means a perfect match, resulting in a 100% match score, distance=0;
- the vectors have no matches at all, resulting in a 0% match score, distance=1; or
- a partial or probabilistic match, e.g., a 25% match, with distance=0.75.

Many matches may be generated for each record, because the record is being compared to records in the other database. All these values may be stored or preserved to enable subsequent querying, such as:

"Please return all records with a matching probability higher than 75%."

In operation 235, filtering may be performed to determine whether the value of probabilistic matches exceeds a certain threshold and then include these matches in the output. Records may be filtered after the match to limit the minimum match quality in the result set to, for example, 25% to reduce storage space and eliminate data that has very little value for a particular application.

In operation 240, de-duplication may be performed to ensure that classifiers with close probabilities are not recorded as separate output entities. This may clean the data even more. For example, several probabilistic matches may result in the same distances or scores. Without applying more knowledge from domain expertise, it may be difficult to intelligently eliminate noise. However, for many projects or analyses, the value of information that can be lost in this operation is minimal, and all matches except one with the same score for a particular record may be safely dropped. This operation may not be performed (i.e., it is optional in some circumstances), because it may hide knowledge hidden in the dropped matches.

Linking records may be implemented using a variety of tools and languages, including Java to create an interface-driven implementation of the matching stages of data retrieval, data cleanup, and data matching. An interface-driven implementation (or interface-based approach) defines a "data connection interface," which is responsible for reading a data record, a "cleaner interface," which is responsible for preparing fields in the records for matches, and a "matching interface," which is responsible for calculating the distance between two data records.

Two approaches may be used to implement the matching. The algorithms may be highly parallelizable, so that the entity resolution process may be split into a series of sub-processes running at the same time (concurrently) on different processors/execution threads, which may dramatically improve performance of the system. The first approach uses a multi-threaded environment that can spawn as many processes as there are number of available processing cores on specific hardware or virtual infrastructure, such as a dual-core notebook, a quad-core notebook, and a dual Xeon 24-core server, which provided excellent matching performance. The second approach uses a software-based job scheduler that can use infrastructures such as Hadoop. This approach makes the computational infrastructure and architecture highly virtualizable and scalable. One implementation is to use Amazon EC2 Hadoop virtual appliances and an Amazon S3 file system for data input/output.

Probabilistic record linkage as used in the present invention may be multi-parametric (or multi-variable). Parameters selected to produce good results may include cutoff threshold, fields used in matching, atomic comparators (including distance metrics and their options) for these fields, and the quality of these fields.

The cutoff threshold may be a numeric value from 0 to 1 that determines the minimum quality of a record match to be included in result. Values in the range 0.80-0.95 are common. The threshold may filter the results based on the total sum of numeric values produced by atomic probabilistic distance metrics.

The fields used in matching may include a list of columns from one table that would be matched to a list of columns in another one. These fields should include high quality features for the classifier.

Atomic comparators may comprise one or more distance methods and their combination(s). Such methods may include the following comparators: Numeric, Dice (also called Dice's or Serensen-Dice) coefficient, Jaro-Winkler, Jaro-Winkler Tokenized, Levenstein, Weighted Levenstein, Person Name, Soundex, Norphone, Metaphone, QGram, and Geoposition.

The quality of these fields may be a numeric value from 0 to 1, where 0 corresponds to the lowest quality and 1 corresponds to deterministic quality. Values in the range 0.5-0.9 are common. There may be a decision tree for each atomic match—a low threshold and a high threshold. If the distance falls below the low threshold, it is considered a non-match, if between the low and the high threshold it is considered a probabilistic match, with a value assigned between 0 and 1, and if above the high threshold, it is considered a deterministic match with value 1. In most cases, high-quality qualifiers have a wider range of threshold values, for example (min=0; max=0.9), and low-quality qualifiers have a narrower range of threshold values, such as (min=0.5; max=0.7).

Figure 3:
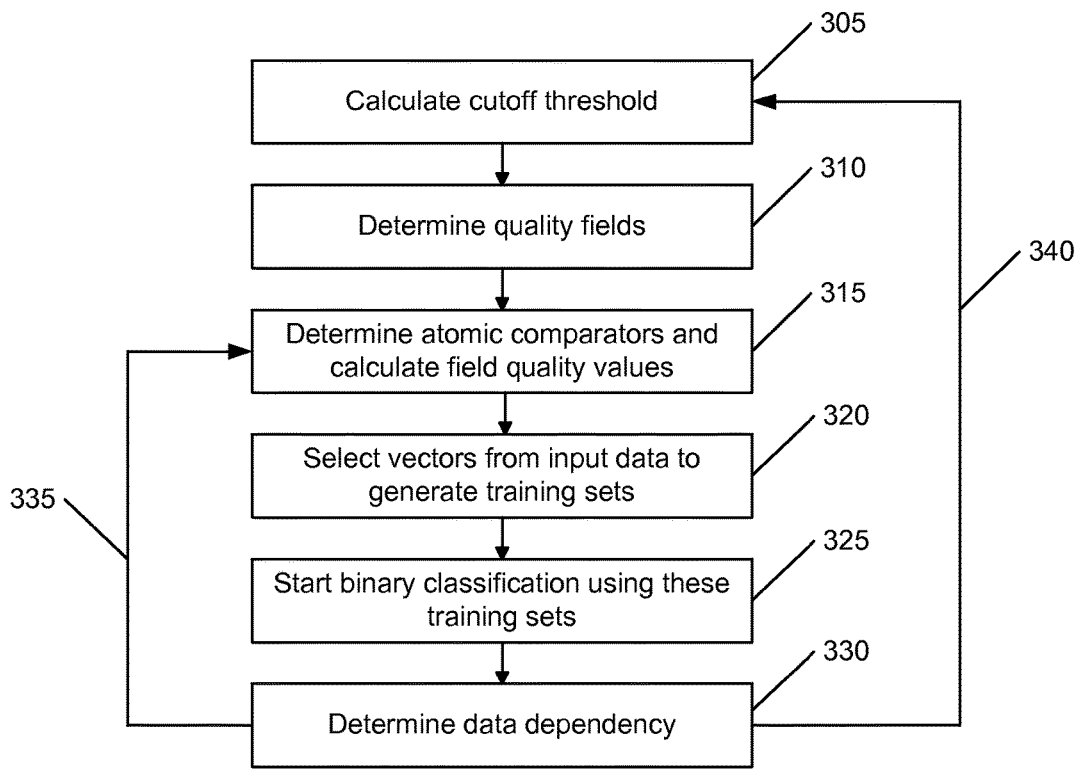
FIG. 3 is a flowchart showing the process of selecting parameters, according to an embodiment of the present invention.
Figure 4:
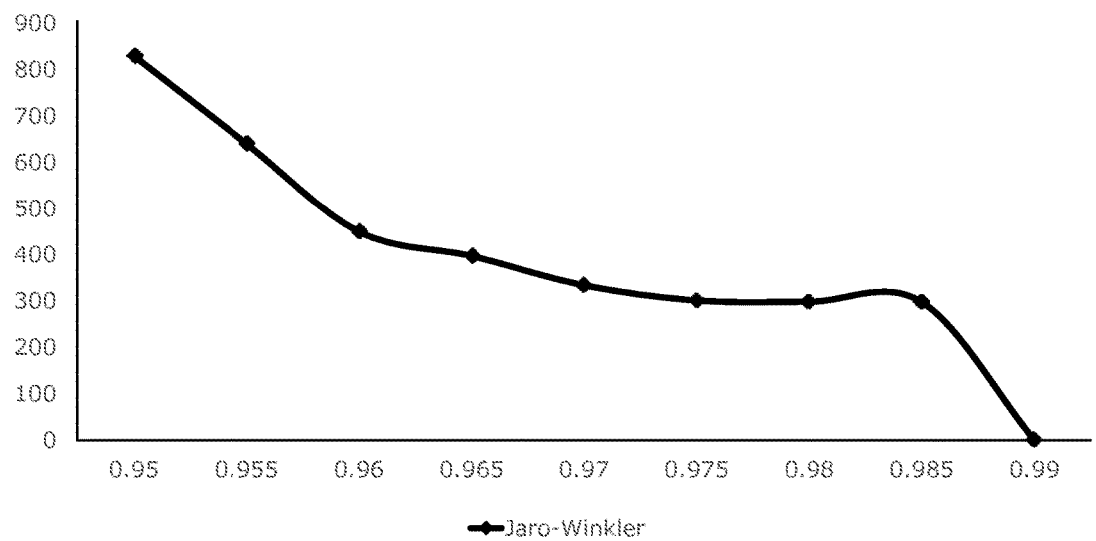
FIG. 4 is a graph showing the showing the efficiency of embodiments of the present invention.

Reference is now made to FIG. 3, which is a flowchart illustrating automatic selection of parameters, according to an embodiment of the invention. In operation 305, a cutoff threshold may be calculated by selecting an initial cutoff threshold, running an entity resolution algorithm (such as a Jaro-Winkler algorithm), and observing the number of matches it produces. If the initial cutoff threshold is low, the number of matches would be large (every record from one database will match a record from another database); if the initial cutoff threshold is high (e.g., close to 1), the number of matches may drop to zero (depending on the data quality) or to the number of records that can be matched deterministically. Running the algorithm several times and increasing the cutoff threshold value may allow the system to determine the area in which the number of matches is relatively stable, as shown in FIG. 4, which is a graph showing the number of matches vs. the cutoff threshold value using Jaro-Winkler distance. The graph shows that in the cutoff range between 0.970 and 0.985, the number of matches is very stable, which means that the method is stable in that cutoff range, so the system may select a value in this range as a cutoff threshold value to be used to generate reliable linkages. If there is no area of stability in the number of matches, matching is likely unstable and unreliable, which may indicate an incorrect selection of matching fields or incorrect selection of parameters.

In operation 310, quality fields may be determined (e.g., the fields or components of each record to be included in a sub-vector), and the determination may be made using some domain knowledge. Determination may be based on selecting the highest quality fields available that most uniquely characterize the record being linked. Fields may also be determined by making various field combinations to match one database to another and observing the distribution of matches. A combination may be correct if there is a stability region as shown in FIG. 4, while running an algorithm with different parameters several times, as described above.

In operation 315, atomic comparators may be determined and field quality values may be calculated to assign a weight for each field. Distance metrics and weights for each field may be derived from domain knowledge, and/or may be determined automatically. The approach of making changes to one parameter at a time and comparing the result quality as in operations 305 and 310 may work, but that approach may not be practically feasible because it may be too slow. Genetic algorithms, harmony searches, and support vector machines may reduce the amount of calculation and thus speed up the process. And determining atomic comparators and calculating field quality values may involve finding a multi-parametric area in an algorithmic curve in which the number of matches changes very little in relation to changes in the field quality values and atomic comparators.

A genetic algorithm is a search heuristic that mimics the process of natural selection. The algorithm starts by adjusting one parameter, producing results, and then adjusting another parameter and producing a second generation of results with a fitness function searching for optimal distribution of the number of probabilistic matches.

A harmony search is a phenomenon-mimicking algorithm (also known as meta-heuristic algorithm, soft computing algorithm, or evolutionary algorithm) inspired by the improvisation process of musicians. A harmony search tries to find a vector of parameters which optimizes (minimizes or maximizes) a certain objective function. This function is similar to a fitness function in a genetic algorithm.

A support vector machine (SVM), which is an example of a machine-learning algorithm, operates as follows. Given a set of training examples, each marked as belonging to one of two categories, an SVM training algorithm builds a model that assigns new examples into one category or the other, making it a non-probabilistic binary linear classifier. An SVM model is a representation of the examples as points in space, mapped so that the examples of the separate categories are divided by a clear gap that is as wide as possible. Several steps may be performed to implement an SVM.

First, the SVM algorithm identifies "exact match" and "total dissimilarity" parameters vectors that give high and zero confidence results. Second, the algorithm injects into a matching process parameters vectors that are closest to both the exact match and total dissimilarity vectors. Third, binary classification using a seed training set may be performed. The algorithm iteratively adds not yet classified parameters vectors to a training set. This is called the nearest neighbor approach. Next, SVM iteratively trains, and when the training completes, additional parameters vectors are added to a training set while the SVM is being retrained. In this way, SVM trains to first recognize very simple cases when there is a high-quality match and a very low-quality match, and then gradually fine-tunes to be more selective on other parameters' vectors to determine whether the configuration is getting better or worse.

It is possible to use artificial intelligence methods (including these three methods) to select these parameters automatically, as shown in FIG. 3. In operation 320, vectors may be selected from input data and the vectors can be used as a training set in an efficient way. For example, the following vectors may be selected: vectors with the closest match to the exact match vector and vectors as far away from a match as possible (or closest to a dissimilarity vector). This generates two training sets—a match set and a non-match set. In operation 325, these training sets may be used to start binary classification. A vector may be sampled against the training sets so as to determine in which set the vector should go. The nearest neighbors may be iteratively added to both sets, while the farthest neighbors are added then and an SVM is trained in each case. In operation 330, genetic or harmony methods may be used to allow the user to determine dependency of the data from the particular multi-parametric setup. Parameters such as atomic distance metrics may be selected by iterating a dictionary of all distance metrics, and numeric values of weights and cutoff threshold may be selected by iterating their values from 0 to 1 using a pre-defined step, which will typically not exceed 0.001. If, after operation 330 is completed, the results are not satisfactory, the flow may go back to operation 315 along path 335 to use different weights for the fields. Alternatively, if the algorithm is unstable after operation 330, the flow may go back to operation 305 along path 340 to start the process again using a different cutoff threshold.

Besides the operations shown in FIGS. 2 and 3, other operations or series of operations are contemplated to resolve entities and determine matches. Moreover, the actual orders of the operations in the flow diagrams are not intended to be limiting, and the operations may be performed in any practical order. For example, operations 215 and 240 need not be performed.

Figure 5:
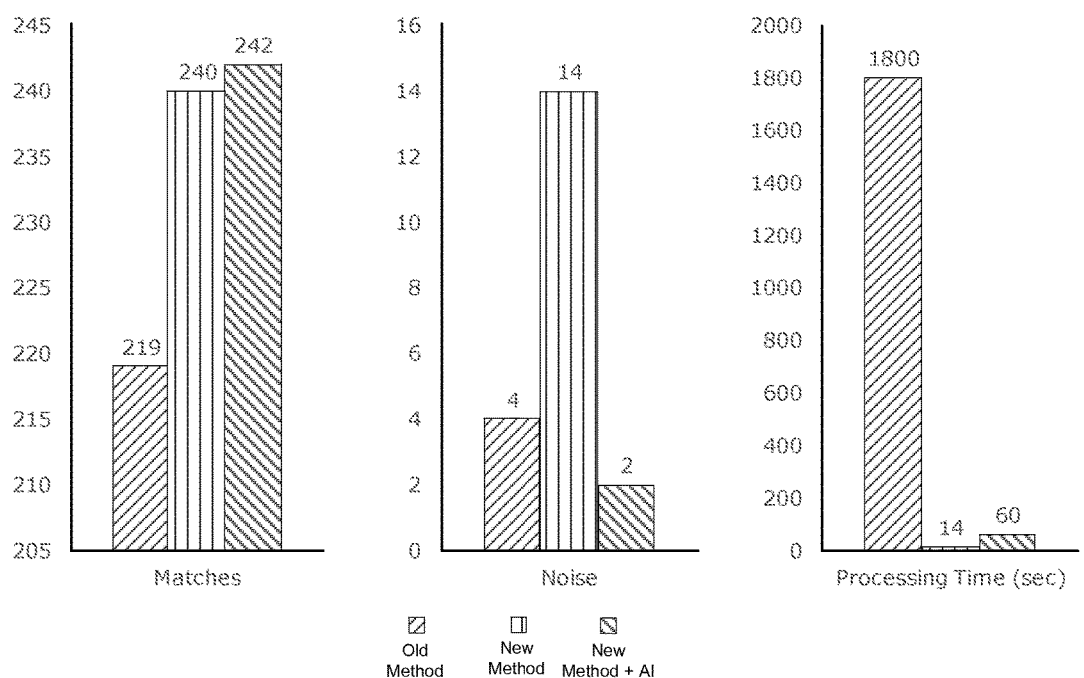
FIG. 5 is a graph showing the results of embodiments of the present invention.

FIG. 5 is another graph showing the results of embodiments of the present invention. This graph includes three bar charts showing the results of record linkage for two different databases using three different linking methods, the old (conventional) method, a new method, and the new method+AI (artificial intelligence), with the latter two methods embodiments of the present invention. (In this embodiment, the databases are related to clinical trials, but the invention is not limited to this area.) The bar charts are as follows: The chart called "Matches" shows the number of records linked between two databases, which is a count of "resolved" entities. The graph called "Noise" shows the number of false-positives in the resulting linked set, where the false positives were determined manually. The third graph shows the processing time in seconds.

The old method uses simple regular expression-based matching with SQL scripts. The new method is a probabilistic distance-based method disclosed in this patent application using distance metrics and empirically selected weights for selected databases. The third method, the new method+AI, includes the distance-based method disclosed in this patent application using automated selection of weights corresponding to atomic matches and algorithms (or comparators) for distance comparisons. As discussed above, some of the distance algorithms used for atomic distance assessment between two different fields of the two compared records include Dice Coefficient, Jaro-Winkler, Jaro-Winkler Tokenized, Levenstein, Numeric, Person Name, Weighted Levenstein, Soundex, Norphone, Metaphone, QGram, and Geoposition. The algorithms may operate better on certain strings or certain types of data, for example, Jaro-Winkler works well with short strings; Jaro-Winkler Tokenized works better with longer strings, but may be slow; Levenstein works better with strings that have no spaces; Dice Coefficient works well comparing strings with spaces, such as sentences; Soundex, Norphone, and Metaphone work well on strings written from voice and voice-like files, and they may account for accents, different languages, and may estimate mistakes humans make while speaking.

Distance metrics is one of the algorithm parameters and may be selected manually from domain knowledge or automatically by one of the disclosed methods. For each particular field inside a record, only a single distance algorithm may be used, but it may be repeated many times in order to make a conclusive decision. Since records contain a set of fields (columns in the database), each of the fields may have a dedicated atomic comparator, suited to the type of data in the field, as discussed above.

The graph in FIG. 5 shows use of Dice index and Jaro-Winkler comparators for two different fields within a record. In this example, the fields were "Title" and "StudyID," and an internal database was linked to the public ClinicalTrials.gov database. For the column "Title," the cleaner was a lower case normalized cleaner, which removes trailing spaces and converts all characters to lower case, and the comparator was a Dice index comparator. For the column "StudyID," the cleaner was a custom protocol cleaner, which removes white spaces and converts letters to uppercase, and the comparator was a custom protocol ID comparator modified to include a "special cases" Jaro-Winkler comparator. The weights for the comparators were chosen to be 0.7 as was the total threshold. In one configuration, the total distance D between sub-vectors was calculated as:

$$D=0.7*DiceComparator(field:Title)+0.7*Jaro-Winkler(field:StudyID) \quad (Eq. 11)$$

The previous embodiments are described in the setting of linking records in databases used for clinical trials, including clinical trials for drugs or medical devices. It is understood, however, that embodiments of the invention can be used in other fields, including Master data management, data warehousing and business intelligence, historical research, customer profiling and customer research, social networking, and social data aggregation.

One benefit of the present invention is that there is no need for a controlled vocabulary before the data are linked. Another benefit is that matching may be achieved without human supervision. The matching may be learned. It may use artificial intelligence techniques to learn about what distance metrics may be used, what weights may be assigned to a particular match, and possible cutoff criteria to provide the highest quality results.

The present invention differs from other systems that may link records. For example, those systems may use deterministic approaches, multiple SQL queries or API calls, curated dictionaries, etc.

Aspects of the present invention may be embodied in the form of a system, a computer program product, or a method. Similarly, aspects of the present invention may be embodied as hardware, software or a combination of both. Aspects of the present invention may be embodied as a computer program product saved on one or more computer-readable media in the form of computer-readable program code embodied thereon.

For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Computer program code in embodiments of the present invention may be written in any suitable programming language. The program code may execute on a single computer, or on a plurality of computers. The computer may include a processing unit in communication with a computer-usable medium, wherein the computer-usable medium contains a set of instructions, and wherein the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A system for linking records from separate clinical trial databases, comprising:
   an enterprise information integration subsystem for receiving data from two separate clinical trial databases;
   a data cleaner for parsing and cleaning the data to generate cleansed data;
   a data normalizer and labeler for normalizing and labeling the cleansed data by standardizing lexical variations and ontological concepts in the cleansed data;
   a feature vector builder for building vectors that include features that map the normalized and labeled data in a finite dimensional space for comparison;
   an entity classifier configured to resolve entities in the finite dimensional space using probabilistic matching;
   an entity clusterer for grouping data based on similarity in the finite dimensional space;
   an application programming interface to interact with the entities resolved by the entity classifier and the data grouped by the entity clusterer; and
   a linked database for storing resolved entities in a harmonized schema having records linked based on the resolved entities.

2. The system of claim 1, wherein the enterprise information integration subsystem provides a database connectivity programming interface to one or more databases.

3. The system of claim 1, wherein the enterprise information integration subsystem supports automatic optimization of SQL queries.

4. The system of claim 1, wherein the application programming interface (API) is a REST-ful API.

5. The system of claim 1, wherein the probabilistic matching comprises calculating a distance between two records.

6. The system of claim 1, wherein the enterprise information integration subsystem integrates several database schemas into one federated schema.

7. The system of claim 1, wherein cleaning the data comprises at least one of making all letters uppercase, removing trailing spaces, removing hyphens or dashes, converting literals to numbers, and converting numbers to literals.

* * * * *